United States Patent [19]

Matheny

[11] 3,937,901

[45] Feb. 10, 1976

[54] LAMP CONTROL CIRCUIT FOR KEY TELEPHONE SYSTEMS

[75] Inventor: Coy Edwin Matheny, Corinth, Miss.

[73] Assignee: International Telephone & Telegraph Corporation, New York, N.Y.

[22] Filed: June 3, 1974

[21] Appl. No.: 475,420

[52] U.S. Cl. ............................. 179/99; 179/81 R
[51] Int. Cl.² ..................................... H04M 1/21
[58] Field of Search ......... 179/99, 1 B, 1 MN, 18 F, 179/18 FA, 81 R, 84 VF, 84 R, 84 L, 81 C

[56] References Cited
UNITED STATES PATENTS

| | | | |
|---|---|---|---|
| 3,246,082 | 4/1966 | Levy | 179/99 |
| 3,395,256 | 7/1968 | Limiero et al. | 179/99 |
| 3,794,774 | 2/1974 | Kemmerly et al. | 179/81 R |

*Primary Examiner*—Kathleen H. Claffy
*Assistant Examiner*—Gerald L. Brigance
*Attorney, Agent, or Firm*—James B. Raden; Marvin M. Chaban

[57] ABSTRACT

A circuit is provided for detecting the condition of a signalling output being applied by a line circuit to a key telephone and for responding to a predetermined condition of the line circuit. The detecting circuit provides a comparison with the signalling output to identify the signalling output and produce an indication based on the condition signalled by the output. The input to the lamp circuit comparator is compared for amplitude and wave form with a reference for passage of the output signal. With the circuit configuration disclosed, a large range of amplitudes may be used as a basis for comparison in a plurality of wave forms.

5 Claims, 3 Drawing Figures

LAMP CONTROL CIRCUIT FOR KEY TELEPHONE SYSTEMS

BACKGROUND OF THE INVENTION

In key telephone systems, each of the conditions of a line involved in a call is indicated by a specific visual signal at the line lamps representing that line. By sensing the electrical condition generating that lamp signal, a secondary indication of that condition may be made to trigger an output.

In key systems, the line lamp of a busy signal on a phone is held operated in a steady condition, the line lamp of a phone being rung is flashed at lamp flash rate and the line lamp is winked at a wink rate when the line is in a held condition. A number of ways of sensing the line condition are possible. One approach is to sense the voltage on the line for ringing (intermittent AC), closed loop (low resistance DC line) or hold (high resistance bridged DC across the line).

However, detecting these conditions and responding promptly to a change of the condition requires voltage sensing apparatus which may materially add to the cost of the apparatus in order to provide the necessary degree of sensing. Another approach would be to sense the line circuit relays are operated, since different combinations of relays are operated for each condition. Additional contacts on each relay, slave relays or considerable additional circuitry would be required to implement this form for sensing.

In addition, it has been found that there exists a need for the calling party to know that he has been placed on hold and not disclosed from his call. This is accomplished by connecting a source of audio to the telephone line during the period of time that the calling party has been placed on hold.

SUMMARY OF THE INVENTION

The present invention has as its field of primary application key telephone systems. The circuit of the invention comprises a simple electronic circuit which produces an interrupted AC output of predetermined amplitude and wave form as a reference. This output is compared with a signaling input transmitted to station line lamps by the line circuit of a key telephone system dependent on the line condition. If the reference and the signaling input are in agreement in frequency and amplitude, the condition of the line is readily identified and action can be taken based on that condition. An example of the action which can be taken is to transmit music on the line during a hold condition. The present circuit retains control of the action so that a change of condition may be sensed promptly and reacted to.

In key systems when a line circuit is placed on hold, an interrupted voltage is switched by an interrupter device via the line circuit to the lamps in all key telephone instruments at which the line circuit has an appearance. When the line circuit is idle, no voltage is present on the lamp lead. A constant voltage is switched through the line circuit to the lamp lead when the line circuit is busy. When the line circuit is being rung, a voltage, which is switched at a rate different than the hold rate, is connected to the lamp circuit by the line circuit. When the line is in a hold condition, the A lead of the line is connected to −24 volts (absence of ground). These various signals on the lamp lead represent an indication of the different states of the line circuit. By using the logical comparison of the line circuit state with that of a desired state, an output can be produced on the occurrence of that state. For example, the holding state may be detected and cause my circuit to transfer audio from an isolated balanced source to the telephone line during the holding state only. Use of my invention also provides means for starting and stopping audio sources, such as tape, disc, and wire recorders and playback units.

It is therefore an object of my invention to provide a circuit for sensing an indicator of the condition of a line of a key telephone circuit and to respond to a particular one of these conditions.

It is a further object of the invention to provide a circuit which senses the signaling current applied to a telephone line and uses a measure of the voltage of that current to detect the condition of that telephone line.

The reference voltage is obtained from the interrupter. A further object of the invention is to compare a reference voltage obtained from an interrupter circuit and to cause a reaction when applied voltage agrees with the reference, ending said reaction when the applied voltage changes or otherwise differs from the reference.

DETAILED DESCRIPTION OF THE DRAWINGS

Figure 1:
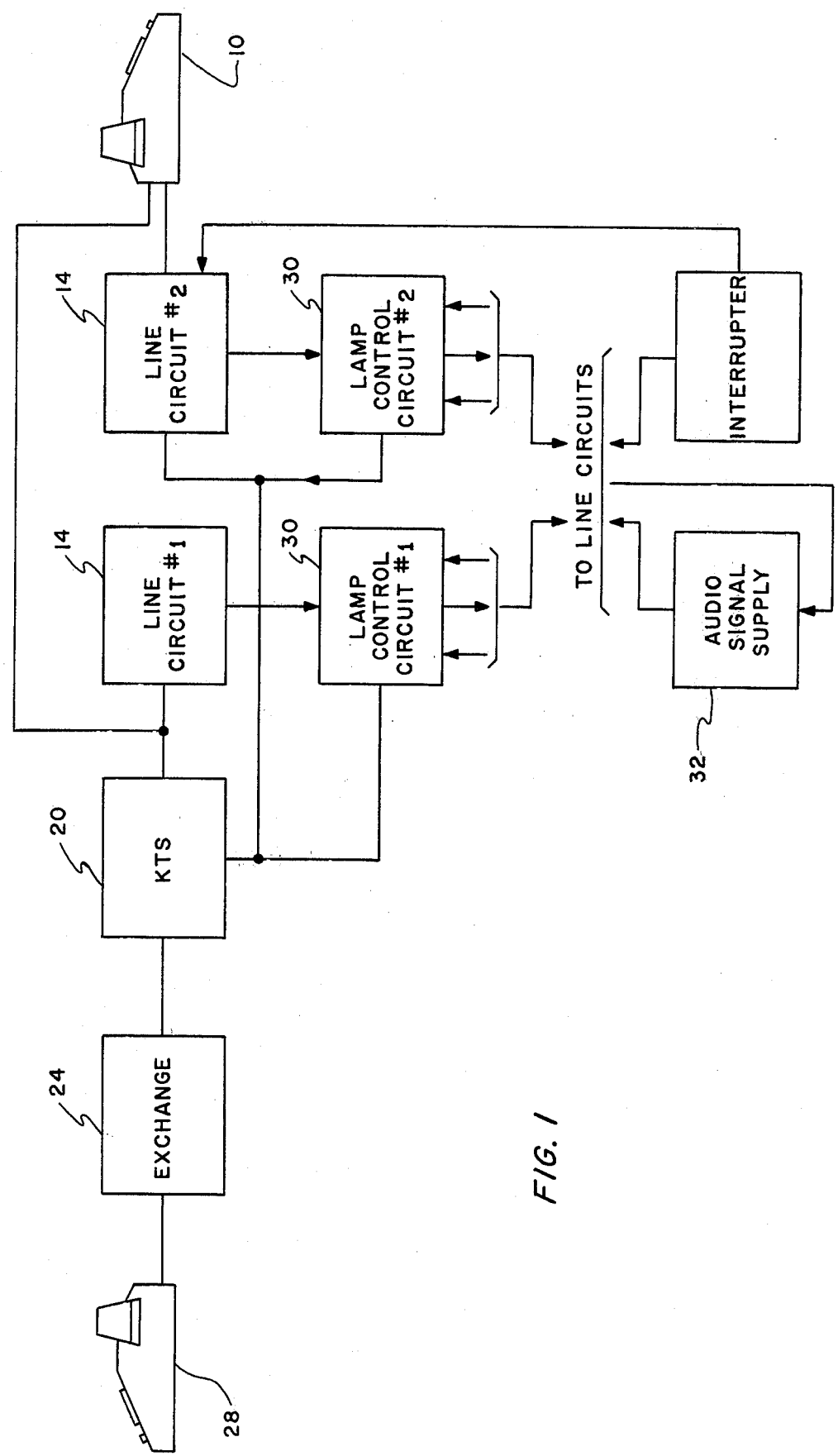
FIG. 1 is a block diagram of a key telephone apparatus within a telephone exchange.

In FIG. 1, I show a key telephone station 10 having access to a plurality of line indicated as line circuits 14, two of which are shown and designated as No. 1 and No. 2. In known fashion, each line circuit having access to a station instrument 10 has an appearance at a respective illuminated pushbutton on the station instrument. Each such pushbutton on depression, controls the connection of the line loop at the station 10 to the line represented by the button. A typical line circuit usable herein is shown by U.S. Pat. No. 3,426,488 to Barbato, issued 4/1/69. The line circuits 14, such as the one disclosed by the patent, all have a connection to a key telephone system designated in FIG. 1 as box 20 which provides access to the central exchange or PABX, designated 24. The exchange 24 has coupled thereto a plurality of telephones shown symbolically as a single station instrument 28.

Connected individually to each line circuit is a lamp control circuit 30 which interfaces between the line circuit and a source of signal supply voltages 32 and an interrupter 36 which may be of any known type.

Figure 2:
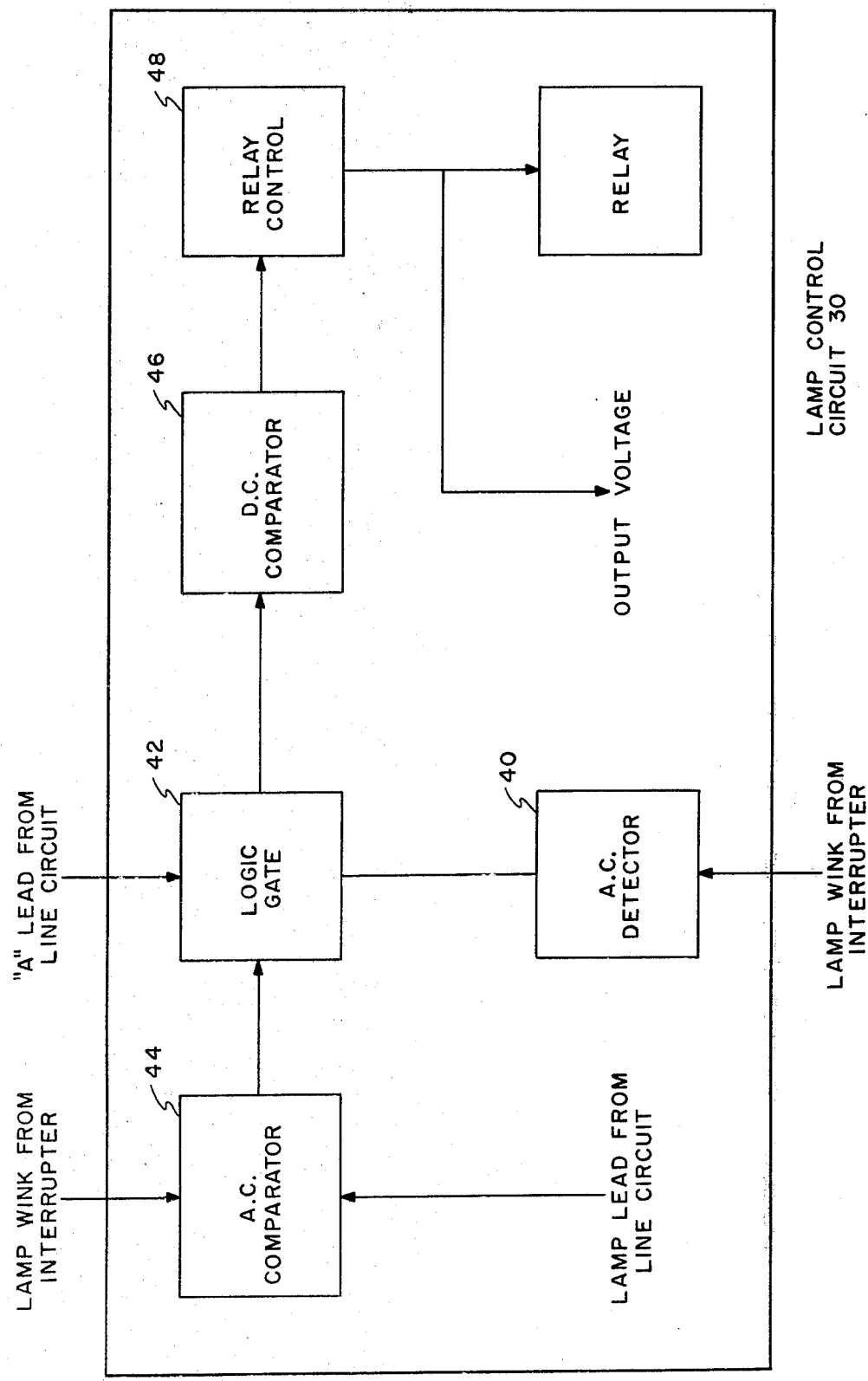
FIG. 2 is a block diagram of the lamp control circuit of FIG. 1.

In FIG. 2, I show in block form a lamp control circuit or comparator 30 which includes an AC detector 40, a logic gate circuit 42, an AC comparator 44, a DC comparator 46, relay control 48 and a relay K. The contacts of the relay may be used to supply music or other suitable audio inputs to the line via a transformer coupled stage or similar isolation device.

Figure 3:
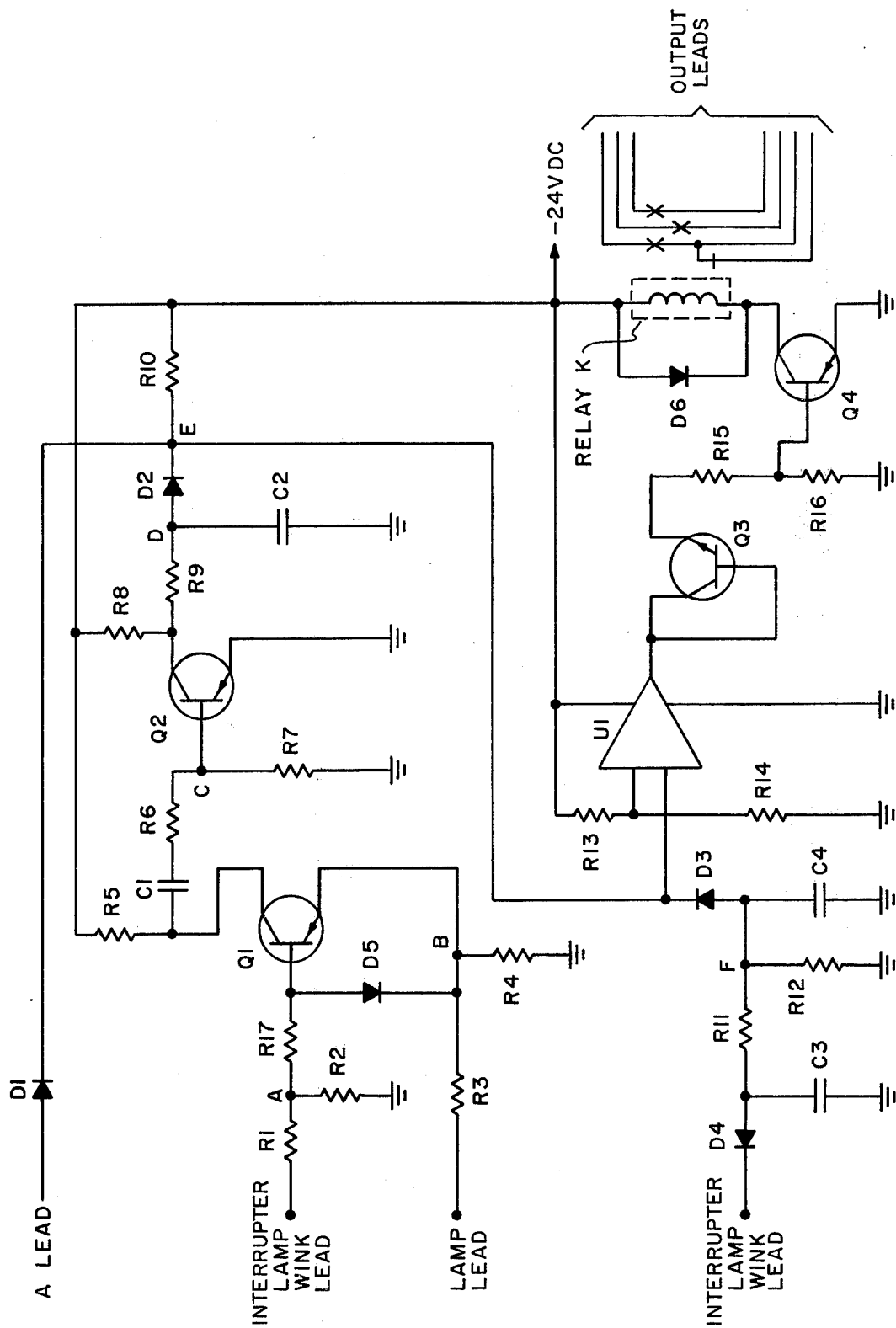
FIG. 3 is a schematic circuit diagram in detail of the comparator of FIG. 2.

In FIG. 3, I show in greater detail my lamp control circuit. A supply of −24 V DC is applied to one end of resistor R10 and the other end is connected to the junction of diodes D1, D2 and D3. Diode D1 is connected to the A lead of the line circuit which has the lamp control circuit connected to it. When the line circuit is not in use or is in the hold mode, a −24 V DC potential is present at the A lead terminal. When the line circuit is in use, a ground source is connected to the A lead of the line circuit via the key telephone set using that line circuit. When ground is present on the A lead terminal of the lamp control circuit, the operation of the lamp control circuit is inhibited. When the A lead is not grounded, that is, when a −24 V DC is present on the A lead, the lamp control circuit operation becomes a function of the AC detector and the AC comparator.

When the interrupter operates in a present key system, it outputs a lamp flash signal of 10 volts AC at a rate of approximately 0.5 seconds on and 0.5 seconds off, a lamp wink signal of 10 volts AC at a rate of approximately 0.45 seconds on and 0.05 off, and an interrupted ringing signal of 10 volts AC, 18 V AC or 105 V AC at a rate of approximately 1 second on and 3 seconds off. The present lamp control circuit comparator is responsive only to the lamp indications resulting from the outputs of the interrupter as well as a constant 10 V AC. These indications (lamp wink, lamp flash, and constant lamp) are switched by the line circuit to a lamp lead. The lamp lead feeds the signal to all lamps on individual key telephone sets indicating the state of that particular line circuit. The lamp lead of each line is also connected to the lamp control circuit where the lamp wink condition (line circuit on hold) is detected and causes the lamp control circuit to operate a relay transferring an audio input to the particular telephone line. A control voltage and relay contacts are also available for starting and stopping suitable audio sources.

When the interrupter operates, a lamp wink signal is applied to resistor R1. Resistors R1 and R2 form a voltage divider network. The output from this network is applied to the base of transistor Q1 via resistor R17. The lamp lead of the line circuit being observed by the lamp comparator circuit is connected to resistor R3. Resistors R3 and R4 form a voltage divider network. The output from this network is applied to the emitter of transistor Q1. The AC difference voltage between the voltage at R1 and the voltage at R3 alternately forward bias and reverse bias the emitter base junction of transistor Q1. When the emitter-base junction of Q1 is forward biased, collector current flows and the variations in collector current are coupled through capacitor C1 and resistor R6 to the base of transistor Q2. This causes transistor Q2 to saturate on the negative portions of the base signal and discharge capacitor C2 through resistor R9. This places a low negative potential on capacitor C2 while transistor Q2 conducts. Diode D2 conducts and this places a low negative potential at point E.

The low negative potential is applied to the noninverting input of the operational amplifier and, because it is less negative than the reference voltage at the inverting input of the operational amplifier, the operational amplifier output is held at approximately ground. Diode D5 protects Q1's emitter base junction from reverse voltages.

When there is no difference between the signals applied to resistors R1 and R3, transistor Q1 does not conduct and no signal is coupled from the collector of Q1 to turn on transistor Q2. Capacitor C2 charges to a −24 V DC potential. This potential causes diode D2 to cut off and the potential at point E is governed by the other diodes in the matrix D1 and D3.

If the A lead is not grounded by a key telephone set, a −24 V DC on that lead will cause diode D1 to cut off and now the voltage at point E is a function of the potential at point F and diode D3. When the two previously mentioned functions occur, the AC detector controls the operation of the lamp circuit comparator.

If the interrupter is operating, a lamp wink signal will be present at diode D4. This 10 V AC lamp wink signal is rectified by diode D4 and capacitor C3 charges to the peak value of the signal. Resistors R11 and R12 form a voltage divider network and capacitor C4 adds to the filtering of the ripple on the rectified signal. The voltage at point F is approximately −7 volts direct current. Because diodes D1 and D2 are cut off and the junction of all three diodes (D1, D2 and D3) are returned to a −24 V DC potential through resistor R10, diode D3 conducts and a negative DC potential of approximately −7.6 volts is present at point E. This negative potential is more negative than the reference voltage at point G of the voltage divider network of R13 and R14. The non-inverting input of the operational amplifier is now more negative than the inverting input and the operational amplifier output switches from approximately −1 V DC to approximately −23 V DC. This −23 V DC output causes zener action of transistor Q3. Transistor Q3 breaks down, applying a negative voltage via R15 to the base of transistor Q4. This turns on transistor Q4 which energizes the K relay. The K relay operates its contacts to start the audio source and/or switches the output of an audio source across the telephone line.

The timing of signals is of prime importance in this operation. The following table shows the significance of the signals in discerning line condition.

| A Lead | LW from Interrupter | Lamp Lead Signal | Circuit Operates |
|---|---|---|---|
| 0 V | Yes | Lamp Constant | No |
| −24 V DC | Yes | Lamp Flash | No |
| −24 V DC | Yes | Lamp Wink | Yes |
| −24 V DC | No | None | No |
| −24 V DC | Yes | None | No |

The reference signal here is the Lamp Wink signal. When the Lamp Lead signal agrees with the reference signal, the circuit will operate.

A ground or zero volts on the A lead inhibits the operation of the lamp control circuit. This inhibition signals the lamp circuit comparator that the line circuit is busy, that is, a closed loop is present on that telephone line. A −24 V DC on the A lead indicates three possibilities: (1) The telephone line may be idle; (2) The line may be in the hold condition; or (3) The line may be being rung. To determine which of these three conditions exists, a second question is asked by the lamp circuit comparator - Is the interrupter operating in the system? If the answer is "No," then the circuit will not operate. If the answer is "Yes," the lamp lead is tested for the lamp wink signal. When a lamp wink signal is present on the lamp lead, the circuit will operate and energize the transfer relay K.

In this way, I provide a simple condition sensing circuit applicable to any key system to determine the condition of the line as being rung, held or busy.

Other applications of the circuit are as follows: (1) To provide a priority answer circuit. The lamp circuit comparator can be used to start a timing device when the line circuit is in the ring-up condition. Here the reference input is the lamp flash signal. When the lamp circuit comparator operates, it will start a timer which will give an output at the end of the timing cycle. This output will initiate visual and/or audible signalling to an attendant that this particular line circuit has not been answered in the prescribed time interval.

Other uses of the circuit to sense conditions and provide a reaction may be readily comprehended from the foregoing explanation.

I claim:

1. In a key telephone system, a circuit for detecting the condition of a line in the system, in which the line may be in one state in which a line lamp representing that line is being pulsed by a signal comprised of current interrupted at a first rate, or in a second state in which the lamp is being pulsed by a signal comprised of current interrupted at a second rate, said circuit including means receptive of a current signal directed toward the line lamp, means for receiving a reference signal at a predetermined amplitude and at an interrupted predetermined one of said rates, means for comparing the rate of the signal directed toward said lamp against the predetermined signal rate, and means responsive to the rate of the signal directed toward said lamp and said predetermined reference signal being essentially identical for producing an output reaction indicative of the signal directed toward the lamp.

2. A circuit as claimed in claim 1, wherein said first rate comprises a wink rate representing a hold condition on the line, and wherein said comparing means also compares the amplitudes of the signals whose rates are being compared, and said reaction producing means comprises gating means for sensing a state of said line and for passing said output reaction to a relay.

3. A circuit as claimed in claim 1, wherein said comparing means includes an AC comparator which receives interrupted lamp current from said line lamp for comparison against interrupted current at said predetermined rate, in which there is a gating member receptive of output from said comparator, means for gating said member responsive to a predetermined signal condition from an A lead conductor at said line circuit for passing said output reaction.

4. In a key telephone system including a station having a plurality of lines terminating thereat with each of said lines having a respective line circuit, a line lamp associated with each line circuit, a circuit for detecting signals at one of a plurality of interrupted signalling rates applied to a lead to a line lamp of one of said lines, including a source of signals at a predetermined one of said rates, means for comparing signals received from said source against the signals applied to the lamp lead of said one line, and output means responsive to the signals of the same rate being compared in said comparing means for emitting an output signal indicative of the identity of the rates of said signals, and means responsive to a predetermined condition of a conductor at said line circuit indicative of the status of said line for passing said output signal, and a bi-stable device switched to its active state responsive to the passing of said output signal.

5. In a system as claimed in claim 4 wherein said conductor comprises the A lead of said line circuit and said predetermined condition comprises an absence of ground on said A lead signifying a hold condition.

* * * * *